Aug. 28, 1962 H. J. FREILING 3,051,206
FRUIT CUTTERS
Filed Nov. 20, 1959

INVENTOR.
HARRY J. FREILING
BY
B. T. Wolbenamith
ATTORNEY

United States Patent Office 3,051,206
Patented Aug. 28, 1962

3,051,206
FRUIT CUTTERS
Harry J. Freiling, 942 Pratt St., Philadelphia, Pa.
Filed Nov. 20, 1959, Ser. No. 854,354
8 Claims. (Cl. 146—73)

This invention relates to cutters for fruit and particularly for melons or grapefruit.

It is the principal object of the present invention to provide a cutter for fruit and particularly for grapefruit and melons that is simple and sturdy in construction and reliable in operation.

It is a further object of the present invention to provide a cutter that is adapted for a multiplicity of sizes of fruit.

It is a further object of the present invention to provide a cutter that serrates the edges of the fruit as it slices the fruit.

Other objects and advantageous features of the invention will be apparent from the description and claims.

The nature and characteristic features of the invention will be more readily understood from the following description, taken in connection with the accompanying drawing forming part thereof, in which.

Figure 1:
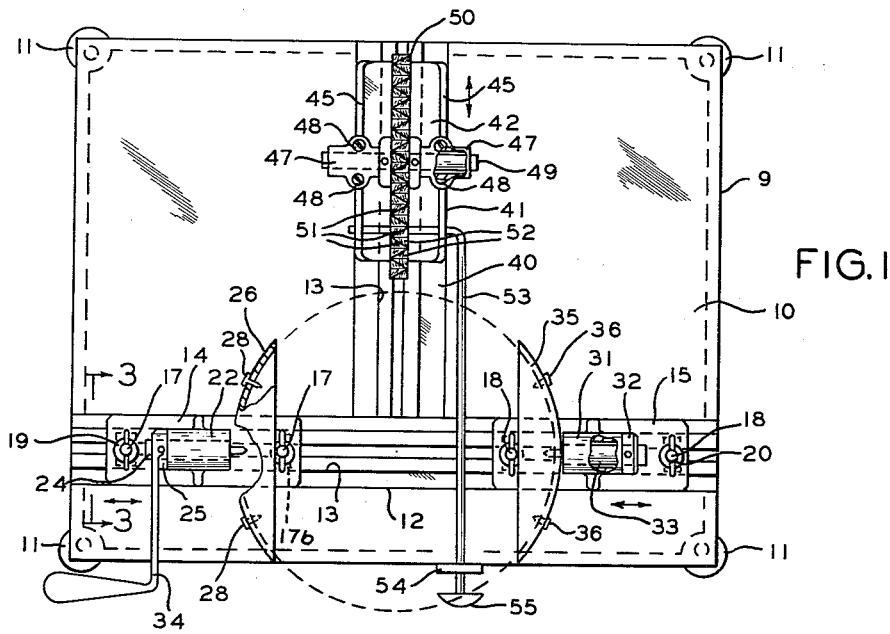
FIGURE 1 is a top plan view of a grapefruit or melon cutter in accordance with the present invention, parts being broken away and parts being shown in section to show the details of construction.
Figure 2:
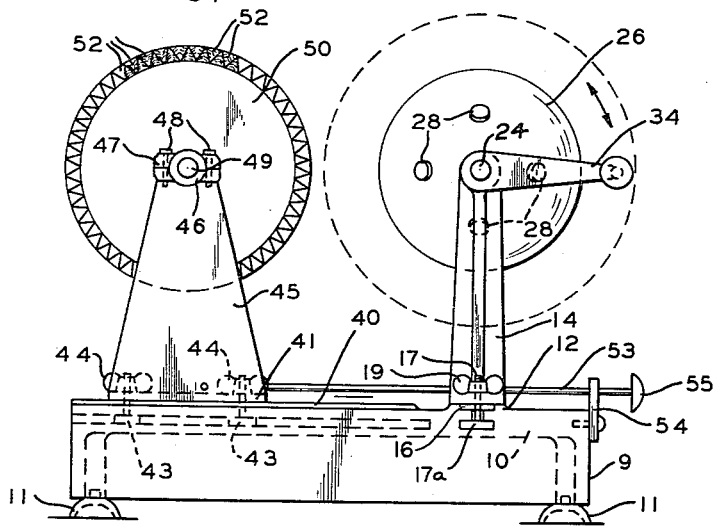
FIG. 2 is a side view of the cutter as seen from the left side of FIG. 1.
Figure 3:
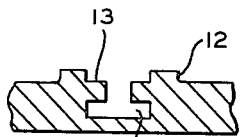
FIG. 3 is a fragmentary vertical sectional view, enlarged, taken approximately on the line 3—3 of FIG. 1.

It should, of course, be understood that the description and drawing herein are illustrative merely, and that various modifications and changes can be made in the structure disclosed without departing from the spirit of the invention.

Like numerals refer to like parts throughout the several views.

Referring now more particularly to the drawing, the fruit cutter in accordance with the present invention preferably includes a rectangular shaped base 9 having supporting feet 11 fastened to the bottom of the base 9. The base 9 has a top plate 10 with an integral trackway 12 thereon parallel to the right edge of the base 9.

The trackway 12 can be of any desired shape but is preferably formed as a T slot 12a, with an upper groove 13 extending therealong.

The trackway 12 has two upright stands 14 and 15 slidably and adjustably mounted thereon by means of bolts 17 and 18 having heads 17a and 17b slidable in the trackway slot 12a and adjusting wing nuts 19 and 20. The stands 14 and 15 have lower ledges 16 which engage in the upper groove 13 and prevent twisting.

The stand 14 is provided at the top thereof with a shaft support 22. The shaft support 22 has a shaft 24 rotatably mounted therein. The shaft 24 is held in place by a collar 25 from which a crank 34 extends for turning and at the other end has a hollow cup shaped disk 26 fastened thereto, a portion of the shaft 24 extending into the disk 26 for engagement with the fruit. Additional pins 28 are also provided to engage the fruit and keep it from rotating within the disk 26.

The stand 15 is provided at the top thereof with a shaft support 31. The shaft support 31 has a shaft 33 rotatably mounted therein. The shaft 33, at one end, has a collar 32 attached thereto for retaining the shaft 33 in position, and a cup shaped disk 35 attached at the other end. The disk 35 has an extension of the shaft 33 extending therein for engagement with the fruit to be sliced. Additional pins 36 are also provided to engage the fruit and to prevent rotation of it within the cup shaped disk 35.

An additional trackway 40 is provided perpendicular to the trackway 12 and extending from the rear of the base plate 10 to the trackway 12. The trackway 40 is shaped the same as the trackway 12. A cutter support 41 is provided having a base 42 slidably mounted on the trackway 40. Bolts 43 having wing nuts 44 thereon can be tightened to hold the base 42 against movement during shipping and loosened to permit sliding movement as desired.

The support 41 has upwardly extending side arms 45 with bearings 46 and separable bearing caps 47 at the upper ends thereof. The bearing caps 47 are held in place by studs 48.

A cutter shaft 49 is provided carried in the bearings 47 and a rotatable disk shaped cutter 50 is secured to the shaft 49 and has cutting edges 51 of zig-zag configuration with relieving grooves 52 therebetween.

In order to advance and retract the cutter support 41, an actuating bar 53, slidably supported in a front bracket 54 can be connected thereto, an actuating handle 55 being provided on the free end of the bar 53.

The mode of operation will now be pointed out.

The grapefruit or melon to be sliced is placed between the cup shaped holding disks 26 and 35. The disks 26 and 35 are positioned at the desired location by sliding and then tightening the wing nuts 19 and 20. The cutter support 41 and the cutter disk 46 carried thereby is advanced to bring the cutting edges 51 into engagement with the fruit to be sliced. The crank 34 is manually operated while the cutter disk 50 is held with its edges 51 against the fruit by the bar 53. Rotation of the fruit is continued until it is severed. The bar 53 is then pushed in to disengage the cutter 50 from the fruit, one of the stands 14 or 15 is loosened and moved away from the other, the severed fruit is removed, a new melon or the like to be cut is inserted, the stands 14 or 15 clamped in position, and the cycle repeated.

It will be noted that the fruit will have a zig zag or notched edge provided thereon so that the fruit is attractively prepared for use and that the edge configuration can be quickly and easily applied thereto.

Accommodations for right or left handed operation can readily be effected by interchanging the stands 14 and 15.

I claim:

1. Apparatus for cutting an article of fruit into halves comprising a base, spaced uprights slidably mounted on said base, members engaging said base and said uprights for retaining said uprights at selected locations, horizontally disposed shafts rotatably mounted at fixed locations on said uprights and in longitudinal axial alignment, separated facing rotatable fruit gripping members carried by said shafts for the reception of an article of fruit to be cut carried therebetween, one of said shafts having a member for rotating said gripping member, a cutter support, members slidably mounting said cutter support on said base for movement toward the rotational axis of said fruit gripping members and to a location between said members, a rotatable cutter mounted on said support and having cutting edges on the periphery thereof, and a member connected to said cutter support for advancing said cutter to cutting engagement with fruit supported between said fruit gripping members.

2. Apparatus for cutting an article of fruit as defined in claim 1 in which said cutting edges are in zig-zag arrangement with radial relief grooves therebetween alternately disposed on opposite faces of said cutter.

3. Apparatus for cutting an article of fruit into halves comprising a base, spaced uprights slidably mounted on said base, horizontally disposed shafts rotatably mounted at fixed locations on said uprights and in longitudinal axial alignment, separated facing rotatable fruit gripping members carried by said shafts for the reception of fruit to be cut carried therebetween, clamping members for holding said uprights at selected locations, one of said shafts having a member for rotating the shaft and the gripping member thereon, a trackway on said base, a cutter support, members slidably mounting said cutter support on said trackway for movement toward the rotational axis of said fruit gripping members and to a location between said members, a rotatable cutter mounted on said support and having cutting edges on the periphery thereof, and a member connected to said cutter support for advancing said cutter to cutting engagement with said article of fruit supported between said fruit gripping members.

4. Apparatus for cutting an article of fruit as defined in claim 3 in which said cutting edges are in zigzag arrangement with radial relief grooves therebetween alternately disposed on opposite faces of said cutter.

5. Apparatus for cutting an article of fruit into halves comprising a base, a trackway on said base, spaced uprights slidably mounted on said trackway, said uprights and said trackway having interengaging portions holding said uprights in alignment, members for engaging said base and said uprights for retaining said uprights at selected locations, separated facing rotatable fruit gripping members carried by said shafts for the reception of an article of fruit to be cut carried therebetween, one of said shafts having a member for rotating said shaft and the gripping member thereon, a cutter support, members slidably mounting said cutter support on said base for movement toward the rotational axis of said fruit gripping members and to a location between said members, a rotatable cutter mounted on said support and having cutting edges on the periphery thereof, and a member connected to said cutter support for advancing said cutter to cutting engagement with an article of fruit supported between said fruit gripping members.

6. Apparatus for cutting an article of fruit as defined in claim 5 in which said cutting edges are in zigzag arrangement with radial relief grooves therebetween alternately disposed on opposite faces of said cutter.

7. Apparatus for cutting an article of fruit into halves comprising a base, a trackway on said base, spaced uprights slidably mounted on said trackway, said uprights and said trackway having interengaging portions holding said uprights in alignment, members engaging said base and said uprights for retaining said uprights at selected locations, separated facing rotatable fruit gripping members carried by said shafts for the reception of an article of fruit to be cut carried therebetween, one of said shafts having a member for rotating said shaft and the gripping member thereon, a second trackway on said base, a cutter support, members slidably mounting said cutter support on said second trackway for movement toward the rotational axis of said fruit gripping members and to a location between said members, a rotatable cutter mounted on said support and having cutting edges on the periphery thereof, and a member connected to said cutter support for advancing said cutter to cutting engagement with an article of fruit supported between said fruit gripping members.

8. Apparatus for cutting an article of fruit as defined in claim 7 in which said cutting edges are in zigzag arrangement with radial relief grooves therebetween alternately disposed on opposite faces of said cutter.

References Cited in the file of this patent
UNITED STATES PATENTS

| | | |
|---|---|---|
| 968,590 | Nayer et al. | Aug. 30, 1910 |
| 1,079,998 | Arrants | Dec. 2, 1913 |
| 1,727,465 | Hamilton | Sept. 10, 1929 |
| 1,924,392 | Barnes | Aug. 29, 1933 |
| 2,047,006 | Crawford | July 7, 1936 |